United States Patent [19]

Massaro

[11] 4,242,774
[45] Jan. 6, 1981

[54] MEAT TENDERER
[76] Inventor: Margaret F. Massaro, 229 Wainwright Ave., Syracuse, N.Y. 13208
[21] Appl. No.: 57,445
[22] Filed: Jul. 13, 1979
[51] Int. Cl.³ ............................................. A22C 9/00
[52] U.S. Cl. ............................................. 17/28; 17/31
[58] Field of Search .................. 17/30, 31, 28, 25, 26, 17/27, 29

[56] References Cited
U.S. PATENT DOCUMENTS

| | | | |
|---|---|---|---|
| 567,471 | 9/1896 | Hasenritter | 17/31 |
| 1,402,778 | 1/1922 | Leonard | 17/30 |
| 2,396,020 | 3/1946 | Savage | 17/28 |

*Primary Examiner*—Willie G. Abercrombie
*Attorney, Agent, or Firm*—Bruns & Jenney

[57] ABSTRACT

A meat tenderer for use by a housewife that includes a support plate having a handle attached to the top surface thereof and a series of thin blades secured to the bottom surface, each blade having a series of triangular-shaped teeth positioned along its length with every other tooth in the series being shorter than the next adjacent tooth.

13 Claims, 5 Drawing Figures

U.S. Patent   Jan. 6, 1981   4,242,774
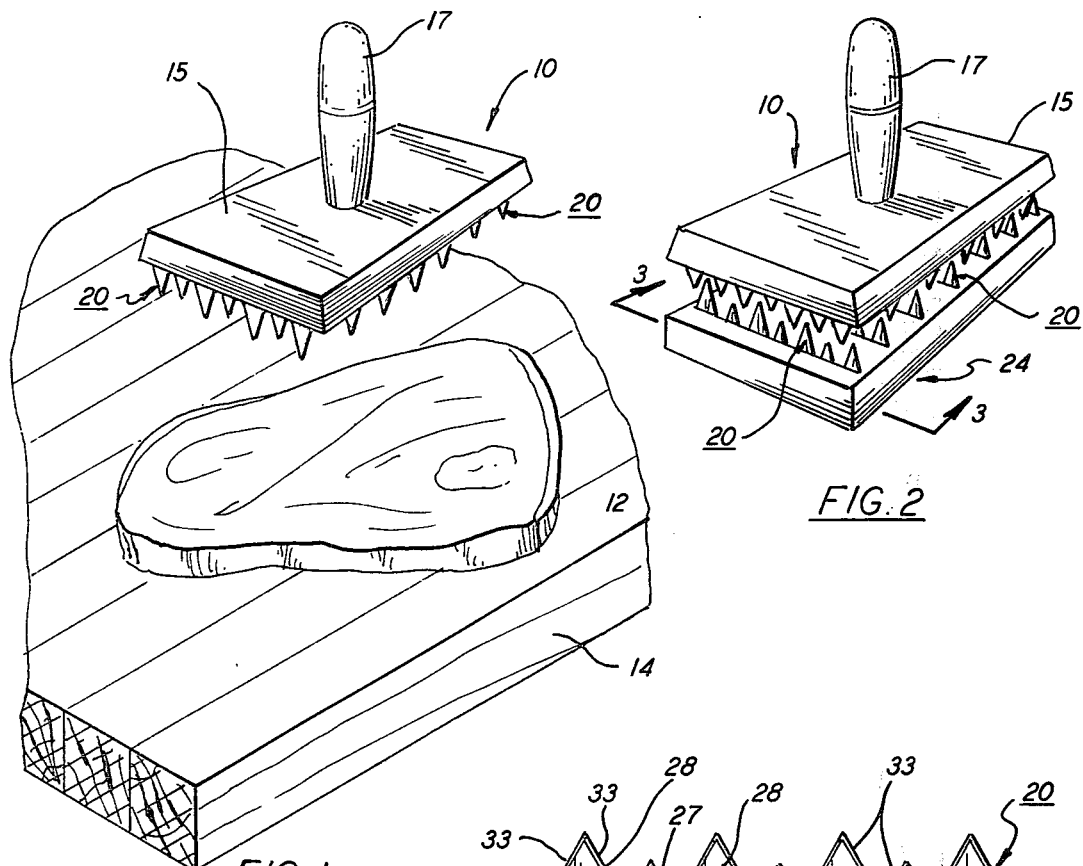
FIG. 1
FIG. 2
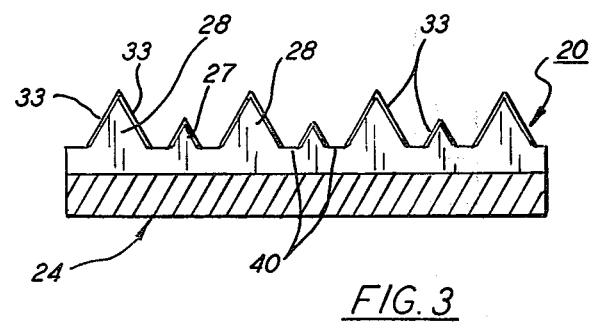
FIG. 3
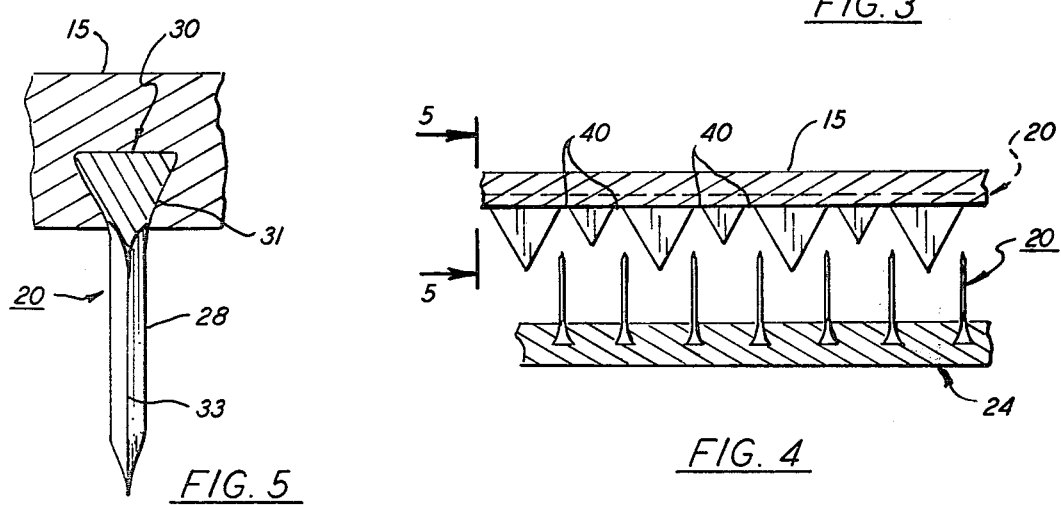
FIG. 5
FIG. 4

MEAT TENDERER

BACKGROUND OF THE INVENTION

This invention relates to a meat tenderer primarily for use in a kitchen by a housewife and, in particular, to a meat tenderer that is capable of easily and efficiently cutting the fibers and/or tough cellular tissue in meat to render the meat more palatable and chewable.

It has long been known that a relatively tough cut of meat can be made more chewable and generally more palatable by mechanically breaking down the meat fibers. This is typically accomplished by beating upon the meat with a heavy implement. As disclosed in U.S. Pat. Nos. 2,396,020 and 715,695, many of the earlier tenderers utilized hinged upper and lower plates containing opposed pyramid-shaped teeth that were capable of being brought down on both sides of the meat with sufficient force to crush the tissues and stringy fibers between the teeth. A good deal of energy had to be applied to the plates in order to accomplish the desired work and, as a result, the average housewife was generally unable to effectively operate the device.

A bladed implement for tenderizing meat is describe in U.S. Pat. No. 2,392,036. This implement contains a plurality of rectangular-shaped blades that are sharpened along the bottom surface to provide a series of relatively long knife-edges for cutting, or more precisely, chopping the meat fibers. In practice, the knife-edges are brought down flat against the meat with a hammering-like motion to deliver a blow of sufficient force to drive the knife-edges into the meat. As noted in this patent, the cleaved meat tends to stick to the blade surfaces and a stripper means is required in order to remove loose meat and the like therefrom. Furthermore, the long, straight cutting edge of each blade is not well suited for chopping through the meat and the flat edge tends to diminish the force of the blow thereby considerably lessening the amount of blade penetration that can be achieved. In the event the blades are driven deeply into the meat, large areas are cleaved apart, resulting in unavoidable damage to otherwise good meat and excessive loss of natural, flavor-producing juices that are so important for the proper preparation of the meat.

Some tenderers also require the use of a vice-like fixture for securely holding the meat while it is being tenderized. A device of this nature is shown in U.S. Pat. No. 802,144. Typically, the meat is held between two coacting plates having openings formed therein. The meat is tenderized by passing a series of rather massive, four-sided teeth, supported upon a hand-held tool, through the openings. In practice, it is somewhat difficult to align the teeth with the appropriate receiving holes at the start of each tenderizing stroke and a considerable amount of force must be applied to the tool in order to produce effective penetration of the meat. By the same token, in order to treat all of the meat area, the meat must be repeatably repositioned within the fixture thereby further complicating the procedure.

SUMMARY OF THE INVENTION

It is therefore an object of the present invention to improve meat tenderers.

A further object of the present invention is to provide a meat tenderer that is capable of cutting sinewy tissue and fiber without producing extensive damaging to the meat itself or effecting excessive loss of the natural meat juices.

Another object of the present invention is to provide a meat tenderer that can be conveniently and effectively used by an average housewife with the expenditure of a minimum amount of energy.

A still further object of the present invention is to provide a meat tenderer that contains a plurality of thin pointed blades of varying heights that are adapted to cooperate to produce a maximum amount of meat tenderizing with a minimum amount of damage to meat.

These and other objects of the present invention are attained by means of a meat tenderer that includes a support plate, a series of thin blades secured in rows in the bottom surface of the support plate with each blade containing a plurality of triangular-shaped teeth with each tooth extending outwardly from the plate and terminating in a point. The two side edges of each tooth forming the point are honed to a knife-edge to provide a sharp point capable of easily penetrating a piece of meat. As the point moves into the meat, the slanted knife-edges slice the meat in small increments to sever the fiber and tissue. Every other tooth on a blade is shorter in height, as measured from the bottom of the plate to the point, than the next adjacent tooth in the blade series. The shorter teeth are used to treat the meat that is compacted between the longer teeth.

BRIEF DESCRIPTION OF THE DRAWINGS

For a better understanding of these and other objects of the present invention reference is had to the following detailed description of the invention which is to be read in conjunction with the accompanying drawings, wherein:

FIG. 1 is a perspective view showing a hand-held tenderer embodying the teachings of the present invention being used to treat a cut of meat situated upon a chopping block;

FIG. 2 is a perspective view of a second embodiment of the invention wherein the hand-held tenderer shown in FIG. 1 is used in conjunction with a base plate having teeth of the same construction as those contained in the hand-held tenderer.

FIG. 3 is a partial section taken along lines 3—3 in FIG. 2 showing the teeth arrangement contained in one of the blades of the present invention.

FIG. 4 is a partial section taken through the hand-held tenderer and the base plate shown in FIG. 2 illustrating the blades contained in the hand-held tenderer turned 90° to the blades contained in the base plate.

FIG. 5 is an enlarged section taken along lines 5—5 in FIG. 4 showing the means by which the individual blades are mounted in the hand-held tenderer and the base plate.

DESCRIPTION OF THE INVENTION

Referring initially to FIG. 1, there is shown a hand-held tenderizing unit, generally referenced 10, that is shown positioned over a cutting board 14 upon which is situated a cut of meat 12. The hand-held tenderer includes a rectangular support plate 15 to which a handle 17 of any suitable design is attached. A plurality of blades 20 extend laterally across the bottom surface of the support plate. Each blade contains a number of spaced-apart teeth that depend downwardly from the bottom surface of the support plate. In practice, the user grasps the handle of the unit and passes the teeth of the blades into the meat. As will be explained in greater detail below, because of the present blade design, the teeth are able to penetrate deeply into the meat to cut any tough or sinewy fibers that might be present without doing serious damage to the more palatable portions of the meat.

Although the hand-held unit may be used in association with a conventional chopping board as noted above, it can be utilized with greater effectiveness with a special independent base plate 24 as illustrated in FIG. 2. The base plate is also generally rectangular in form and, as in the case of the hand-held unit, includes a series of laterally extended thin blades 20 each of which contains a number of teeth spaced along the length thereof. The teeth extend upwardly from the top surface of the plate and terminate in points similar to the teeth supported in the hand-held unit. In operation, a cut of meat to be treated is laid upon the blades of the base plate and the hand-held unit is brought down into contact against the top of the meat. Here again, because of the unique cutting action provided by the blades, the teeth are able to penetrate easily into the meat from both sides to effect the desired tenderization. Although the base plate is shown in FIG. 2 as being about the same size as the hand-held unit, it can be of a considerably larger size to accommodate a large cut of meat thereon. The bottom surface of the base plate is generally flat to permit the base plate to be securely seated upon a counter or a table top.

As best illustrated in FIGS. 3-5, each of the blades that is mounted in the base plate and the support plate of the hand-held unit contains a number of spaced-apart triangular-shaped teeth that lie in the plane of the blade. Each tooth is anchored at its base in the root 30 of the blade. The blade root also contains a male dovetail section 31 which is slidably received within a complimentary groove machined within the supporting plate. In assembly the individual blades are slipped into the grooves, and after the teeth are properly aligned in rows the blades are heat fused to the receiving plate using any suitable welding or soldering process. The height of the teeth along each blade is varied so that one short tooth 27 is positioned adjacent to and preferably between two longer teeth 28. The purpose of this tooth arrangement shall be explained in greater detail below.

Each tooth in a blade series is basically an equilateral triangle. The two upraised sides of the triangle which form the point of the tooth are of equal length so that the point is located over the midpoint of the tooth base. Each side is further honed or otherwise sharpened to a relatively keen knife-edge 33 with the two knife-edges coming together at the tooth apex to create an extremely fine point. The width of each tooth is generally uniform throughout to provide the blade with a relatively thin profile that enhances its ability to penetrate deeply into a cut of meat that is being tenderized.

As the hand-held unit is brought down into contact with a cut of meat positioned upon the chopping block shown in FIG. 1 or the base plate shown in FIG. 2, the sharpened points of the blade teeth pass easily into the meat to establish a fine incision. As the teeth continue to penetrate the meat, the slanted knife-edges along the sides of the teeth generate a slicing action which incrementally widens the incision. The longer teeth on each blade enter the meat first and tend to push or compact uncut meat into the diminishing area between the inclined teeth. This compacting action is herein utilized to further enhance the instant tenderer's ability to treat a cut of meat. Once the compacting of the meat between the longer teeth has started, the shorter teeth will enter the meat in the compacted region. Because the meat in this region is placed under a certain amount of stress, the shorter teeth are able to more efficiently cut through the meat fibers with a minimum amount of effort. As can be seen, any fibers or tough tissues that are contacted by the blades are thus severed thereby rendering the meat more chewable and palatable.

Preferably, the blades are fabricated from relatively strong pieces of steel that can withstand a good deal of impact without losing their edge or breaking. When the meat is supported upon the base plate shown in FIG. 2, the hand-held unit is preferably rotated with reference to the base plate as the meat is being tenderized. Because of the effectiveness of the blades, deep penetration of the meat by the teeth is normally affected from both sides. As the hand unit is rotated, some blade interference may be expected. However, because of the thinness of the blades and the tooth design, the adverse effect of one tooth striking another is greatly diminished. A flat section 40 is provided at the root of the blade that separates the base of each adjacent tooth. The width of the flat section is slightly greater than the width of the teeth so that when the teeth on the hand-held unit are turned 90° from those situated upon the base plate as shown in FIG. 4, the intermeshed teeth can pass by each other and still achieve full penetration of the meat being treated. Similarly, in the event the teeth of one blade strike those of another, there is sufficient flexibility built into the device to allow one of the blades to be simply diverted past the other whereby the teeth can pass fully into the meat. Because of the triangular shape of the teeth, diversion of the blades can be easily accomplished.

As should be evident from the disclosure above, the instant tenderer, through use of its unique blade arrangement, is able to effectively treat a tough piece of meat with a minimum amount of effort. Accordingly, the tenderizer is ideally well suited for use by the average housewife. Furthermore, because of the keen cutting action delivered by the blades, the meat can be tenderized with a minimum amount of harm being done thereto while at the same time preserving most of the flavor-producing natural juices.

While this invention has been described with reference to the structure disclosed herein, it is not confined to the details set forth and this application is intended to cover any modifications or changes as may come within the scope of the following claims.

I claim:

1. A meat tenderer that includes
   a generally flat support plate,
   a handle secured to the top surface of the plate,
   a plurality of thin blades mounted in rows along the bottom surface of the plate, and
   each of said blades further including a series of teeth aligned along its length that depend downwardly from the plate, each of said teeth terminating in a point, and every other tooth along the length of the blade being of shorter length than that of an adjacent tooth.

2. The tenderer of claim 1 wherein each tooth along the blade is an equilateral triangle lying in the plane of the blade.

3. The tenderer of claim 2 wherein the two equal sides of each tooth are provided with a knife-edge whereby the tooth can easily slice through the fibers of a piece of meat.

4. The tenderer of claim 1 wherein the height of every other tooth on a blade, as measured from the bottom surface of the plate to the point of the tooth, is about one-half the height of an adjacent tooth.

5. The tenderer of claim 4 wherein the spacing between the base of each adjacent tooth at the bottom surface of the support plate is at least equal to the width of said teeth.

6. The tenderer of claim 1 wherein the root of each blade contains a male dovetail that is slidably received within a complimentary groove formed in the support plate.

7. The tenderer of claim 1 wherein the blades are mounted in parallel rows that are equally spaced along the bottom surface of the plate.

8. A meat tenderer that includes
   a hand-held tool having a flat support plate containing a handle mounted in the top surface thereof,
   an independent flat base plate having a surface area at least equal to the area of the support plate, said base plate being capable of being seated upon a flat support surface,
   both the bottom surface of the support plate of the hand-held tool and the top surface of the base plate having a plurality of thin blades supported in rows therein with each blade containing a series of teeth aligned along its length with the teeth extending outwardly from the supporting surface and terminating in a point and wherein every other tooth located along the length of a blade is shorter in height than the next adjacent tooth.

9. The tenderer of claim 8 wherein each tooth along the length of a blade is an equilateral triangle lying in the plane of the blade.

10. The tenderer of claim 9 wherein the two equal sides of each tooth are provided with a knife-edge whereby the tooth can slice easily through a cut of meat being treated.

11. The tenderer of claim 10 wherein the height of every other tooth positioned along the length of the blade is about one-half the height of the tooth adjacent thereto.

12. The tenderer of claim 11 wherein the distance between the base of each adjacent tooth, as measured along the supporting surface, is at least equal to the width of said teeth.

13. The tenderer of claim 12 wherein the blades are mounted in spaced-apart parallel rows along the supporting surface with the space between each row being at least equal to the width of the widest tooth as measured across its base.

* * * * *